United States Patent [19]
Cassarino

[11] Patent Number: 5,988,450
[45] Date of Patent: Nov. 23, 1999

[54] COMBINATION CELLULAR PHONE AND PERSONAL DEFENSE SYSTEM

[76] Inventor: Robert J. Cassarino, 610 Encina, P.O. Box 457, San Manuel, Ariz. 85631

[21] Appl. No.: 09/262,178

[22] Filed: Mar. 4, 1999

Related U.S. Application Data

[63] Continuation-in-part of application No. 09/015,208, Jan. 29, 1998, abandoned.
[51] Int. Cl.$^6$ .................................................... F41H 9/00
[52] U.S. Cl. ...................... 222/192; 222/402.11; 42/1.08; 361/232
[58] Field of Search ..................................... 222/175, 192, 222/402.1, 402.11; 42/1.08; 361/232

[56] References Cited

U.S. PATENT DOCUMENTS

| | | | |
|---|---|---|---|
| 4,186,851 | 2/1980 | Cantor | 222/113 |
| 4,982,645 | 1/1991 | Abboud | 89/1.11 |
| 5,429,301 | 7/1995 | Franks | 222/402.11 X |
| 5,476,192 | 12/1995 | Julinot | 222/192 X |
| 5,531,359 | 7/1996 | Winner | 222/153.11 |

*Primary Examiner*—Kenneth Bomberg

[57] ABSTRACT

A combination cellular phone and personal defense system for providing a means of communication and a means of self-defense in one unit. The combination cellular phone and personal defense system includes a cellular telephone having a housing. The housing includes a keypad, a display, an ear piece, a speaker, and an antenna. The cellular telephone has a rechargeable battery disposed within the housing. One side wall of the housing has a recharge port extending inwardly thereof. A personal defense system is incorporated into the housing of the cellular telephone.

8 Claims, 4 Drawing Sheets

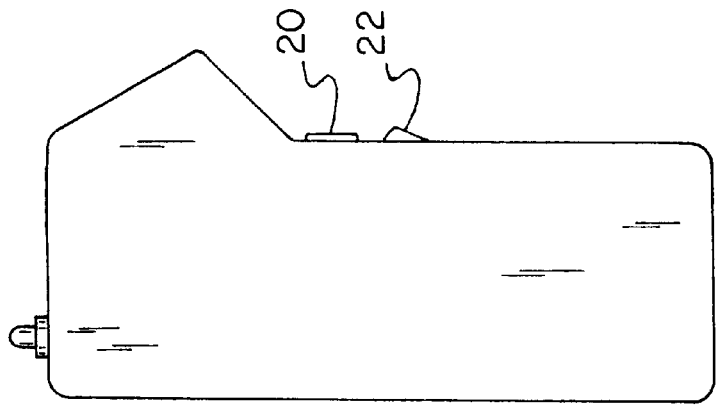
FIG. 4
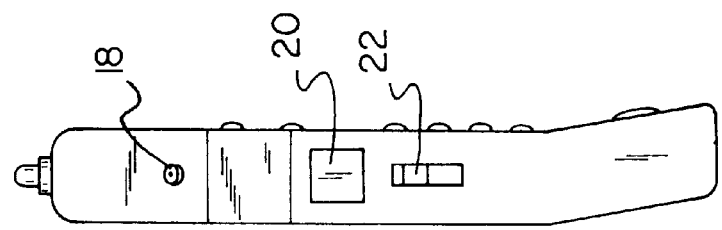
FIG. 3
FIG. 2
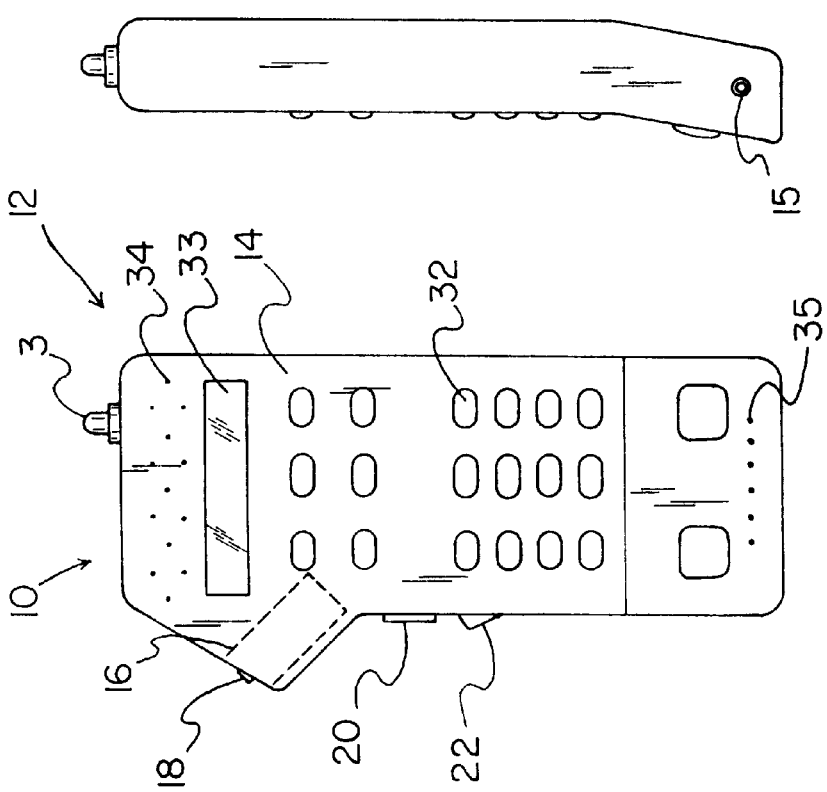
FIG. 1

COMBINATION CELLULAR PHONE AND PERSONAL DEFENSE SYSTEM

RELATED APPLICATIONS

This is a continuation-in-part to my U.S. patent application Ser. No. 09/015,208 filed Jan. 29, 1998.

BACKGROUND OF THE INVENTION

1. Field of the Invention

The present invention relates to cellular phones and spray devices and more particularly pertains to a new combination cellular phone and personal defense system for providing a means of communication and a means of self-defense in one unit.

2. Description of the Prior Art

The use of cellular phones and spray devices is known in the prior art. More specifically, cellular phones and spray devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,624,389 to Ang; U.S. Pat. No. 4,446,990 to Stevenson et al.; U.S. Pat. No. 5,422,656 to Allard et al.; U.S. Pat. No. 5,446,789 to Loy et al.; U.S. Pat. No. Des. 350,744 to Hino; and U.S. Pat. No. Des. 343,172 to Watanabe which are all incorporated by reference herein.

Other known prior art includes U.S. Pat. No. 4,186,851; U.S. Pat. No. 4,982,645; U.S. Pat. No. 5,429,301; U.S. Pat. No. 5,476,192; and U.S. Pat. No. 5,531,359.

While these devices fulfill their respective, particular objectives and requirements, the aforementioned patents do not disclose a new combination cellular phone and personal defense system. The inventive device includes a cellular telephone having a housing. The housing includes a keypad, a display, an ear piece, a speaker, and an antenna. The cellular telephone has a rechargeable battery disposed within the housing. One side wall of the housing has a recharge port extending inwardly thereof. A personal defense system is incorporated into the housing of the cellular telephone.

In these respects, the combination cellular phone and personal defense system according to the present invention substantially departs from the conventional concepts and designs of the prior art, and in so doing provides an apparatus primarily developed for the purpose of providing a means of communication and a means of self-defense in one unit.

SUMMARY OF THE INVENTION

In view of the foregoing disadvantages inherent in the known types of cellular phones and spray devices now present in the prior art, the present invention provides a new combination cellular phone and personal defense system construction wherein the same can be utilized for providing a means of communication and a means of self-defense in one unit.

The general purpose of the present invention, which will be described subsequently in greater detail, is to provide a new combination cellular phone and personal defense system apparatus and method which has many of the advantages of the cellular phones and spray devices mentioned heretofore and many novel features that result in a new combination cellular phone and personal defense system which is not anticipated, rendered obvious, suggested, or even implied by any of the prior art cellular phones and spray devices, either alone or in any combination thereof.

To attain this, the present invention generally comprises a cellular telephone having a housing. The housing includes a keypad, a display, an ear piece, a speaker, and an antenna. The cellular telephone has a rechargeable battery disposed within the housing. One side wall of the housing has a recharge port extending inwardly thereof. A personal defense system is incorporated into the housing of the cellular telephone. The personal defense system includes a cartridge of pepper spray disposed interiorly of the housing. The cartridge is in communication with a nozzle extending outwardly of a side wall of the housing. The nozzle is in communication with an activation switch disposed within the side wall of the housing. The activation switch is in communication with a safety switch disposed within the side wall of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination cellular phone and personal defense system apparatus and method which has many of the advantages of the cellular phones and spray devices mentioned heretofore and many novel features that result in a new combination cellular phone and personal defense system which is not anticipated, rendered obvious, suggested, or even implied by any of the prior art cellular phones and spray devices, either alone or in any combination thereof.

It is another object of the present invention to provide a new combination cellular phone and personal defense system which may be easily and efficiently manufactured and marketed.

It is a further object of the present invention to provide a new combination cellular phone and personal defense system which is of a durable and reliable construction.

An even further object of the present invention is to provide a new combination cellular phone and personal defense system which is susceptible of a low cost of manufacture with regard to both materials and labor, and which accordingly is then susceptible of low prices of sale to the consuming public, thereby making such combination cellular phone and personal defense system economically available to the buying public.

Still yet another object of the present invention is to provide a new combination cellular phone and personal defense system which provides in the apparatuses and methods of the prior art some of the advantages thereof, while simultaneously overcoming some of the disadvantages normally associated therewith.

Still another object of the present invention is to provide a new combination cellular phone and personal defense system for providing a means of communication and a means of self-defense in one unit.

Yet another object of the present invention is to provide a new combination cellular phone and personal defense system which includes a cellular telephone having a housing. The housing includes a keypad, a display, an ear piece, a speaker, and an antenna. The cellular telephone has a rechargeable battery disposed within the housing. One side wall of the housing has a recharge port extending inwardly thereof. A personal defense system is incorporated into the housing of the cellular telephone.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of the preferred embodiment of a new combination cellular phone and personal defense system according to the present invention.

FIG. 2 is a first side view of the preferred embodiment of the present invention.

FIG. 3 is a second side view of the preferred embodiment of the present invention.

FIG. 4 is a rear view of the preferred embodiment of the present invention.

DESCRIPTION OF THE PREFERRED EMBODIMENT

Figure 8:
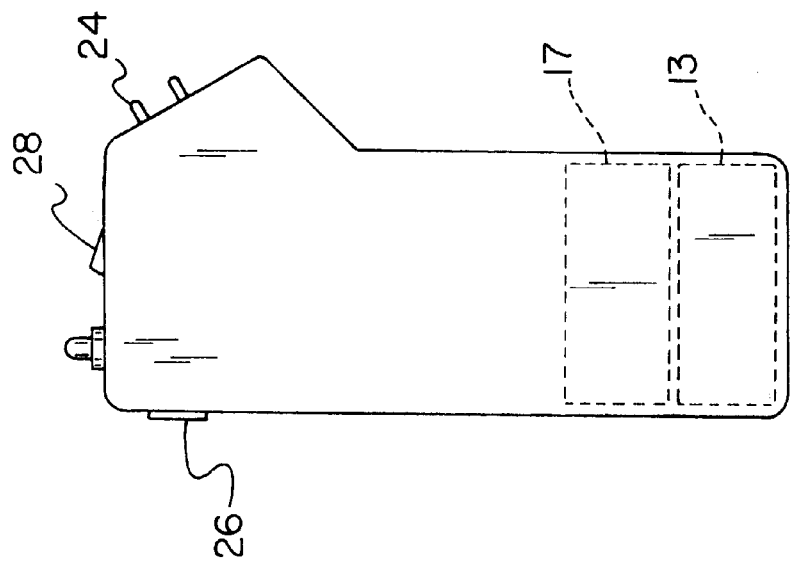
FIG. 8 is a rear view of the second embodiment of the present invention.
Figure 7:
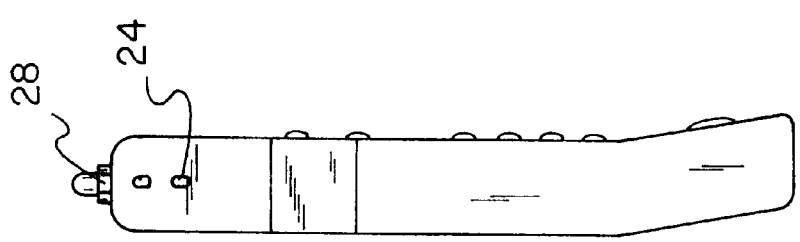
FIG. 7 is a second side view of the second embodiment of the present invention.
Figure 6:
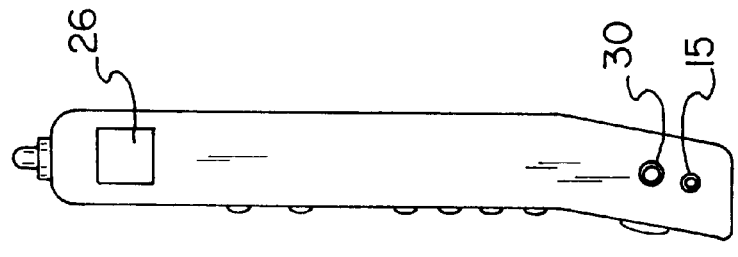
FIG. 6 is a first side view of the second embodiment of the present invention.
Figure 5:
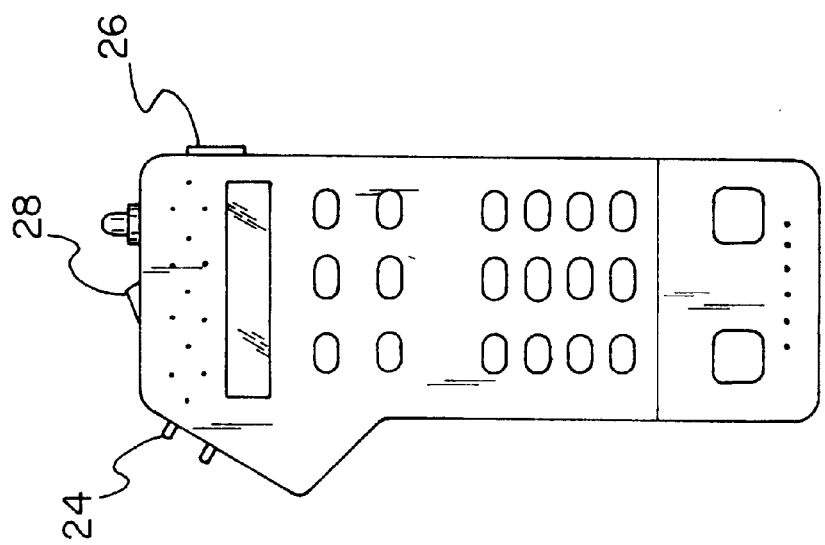
FIG. 5 is a front view of a second embodiment of the present invention.
Figure 12:
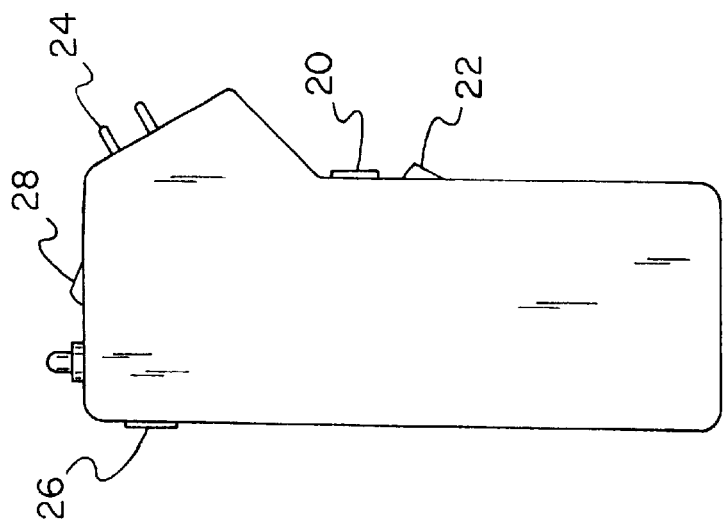
FIG. 12 is a rear view of the third embodiment of the present invention.
Figure 11:
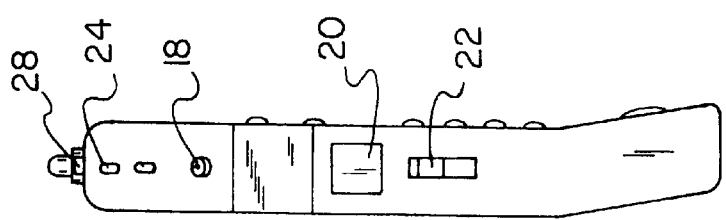
FIG. 11 is a second side view of the third embodiment of the present invention.
Figure 10:
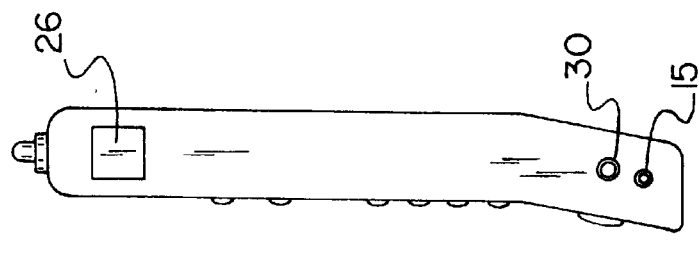
FIG. 10 is a first side view of the third embodiment of the present invention.
Figure 9:
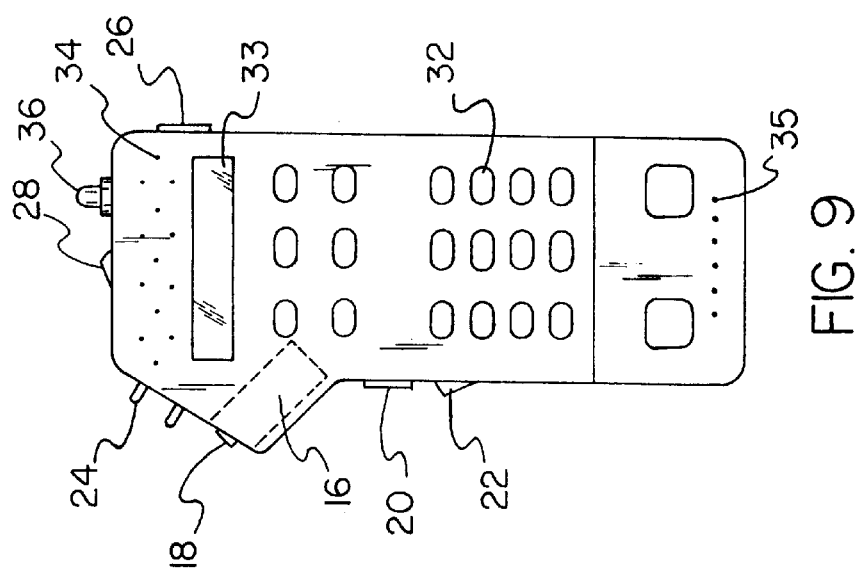
FIG. 9 is a front view of a third embodiment of the present invention.
Figure 13:
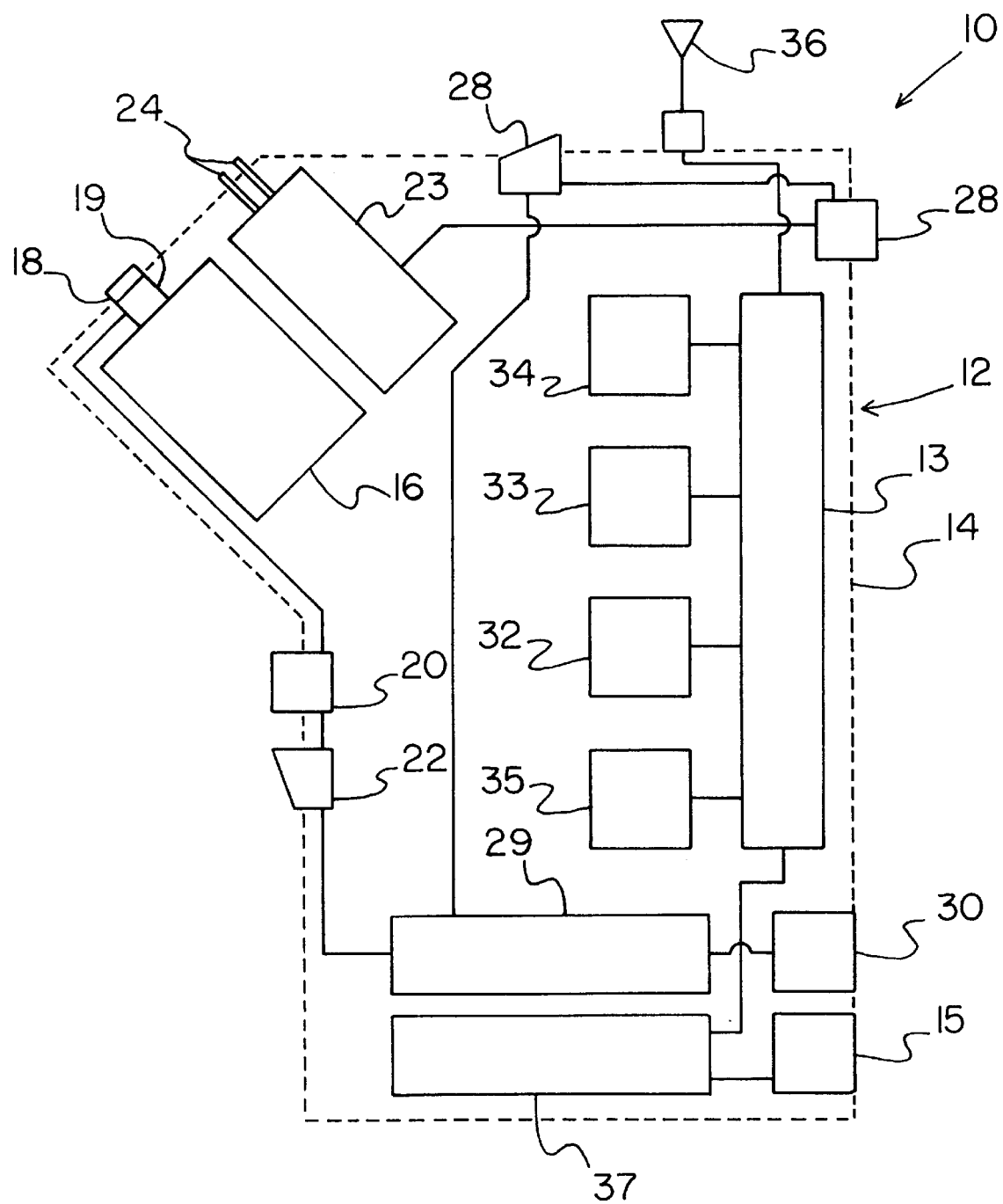
FIG. 13 is an electrical schematic of the connections between the elements of the present invention.

With reference now to the drawings, and in particular to FIGS. 1 through 13 thereof, a new combination cellular phone and personal defense system embodying the principles and concepts of the present invention and generally designated by the reference numeral 10 will be described.

As best illustrated in FIGS. 1 through 13, the combination cellular phone and personal defense system 10 comprises a cellular telephone 12 having a housing 14. Inside the housing are the cellular phone electronics 13 including a CPU, a transmitter, and a receiver. The housing further includes a keypad 32, a visual display 33, an ear piece speaker 34, a mouthpiece microphone 35, and an antenna 36 all electrically connected to the cellular phone electronics 13. The cellular telephone 12 has a first rechargeable battery 37 disposed in the housing and electrically connected to the cellular phone electronics. One side wall of the housing 14 has a first recharge port 15 extending inwardly thereof. The first recharge port is electrically connected to the first rechargeable battery to permit electrically connecting said first rechargeable battery to an electrically power supply for recharging of the battery.

A personal defense system is incorporated into the housing 14 of the cellular telephone 12. The personal defense system includes a cartridge of pepper spray 16 disposed interiorly of the housing 14. The cartridge 16 is in communication with a nozzle 18 extending outwardly of a side wall of the housing 14. The nozzle 18 has a valve 19 for selectively opening and closing passage (i.e., spraying) of pepper spray out of the nozzle from the cartridge. The valve is in communication with a first activation switch 20 disposed in the side wall of the housing 14 so that activation of the first activation switch opens the valve to permit pepper spray to be sprayed out of the nozzle.

Preferably, the activation switch 20 is in communication with a first safety switch 22 disposed in the side wall of the housing 14. Note FIGS. 1–4. This first safety switch selectively controls activation of the first activation switch. In use, the first activation switch is only able to be activated when the first safety switch is previously activated. When the first safety switch is deactivated, the first activation switch may not be subsequently activated until the first safety switch is re-activated. This system helps prevent a user for accidentally spraying pepper spray into their own face when using the cellular phone to communicate with another.

In a second embodiment of the present invention, as illustrated in FIGS. 5–8, the pepper spray 16 may replaced with a taser 23 or, in an ideal third embodiment, as illustrated in FIGS. 9–12, the personal defense system is a combination pepper sprayer and taser so that a user may choose either personal defense system to defend themselves in a variety of different circumstances. The taser 23 includes a pair of prongs 24 extending outwardly of the housing 14 from which the electric shock of the taser emits. The taser includes a second activation switch 26 electrically connected to the taser for selectively activating the taser to emit is personal defense electric shock from the prongs 24.

The taser also preferably includes a second safety switch 28 which is electrically connected to the second activation switch to permit selective activation of the second activation switch in a similar manner that the first safety switch control activation of the first activation switch. In use, activation of the second safety switch permits activation of the second activation switch to activate the taser while when the second safety switch is de-activated, the second safety switch may not be activated. This safety feature is designed to help prevent accidental electrocution of the user when using the cellular phone to communicate.

The taser is powered by its own rechargeable battery 29 disposed in the housing 14 and electrically connected to the taser. Preferably, this battery 29 is also electrically connected to the valve 19 of the nozzle 18 via the first activation switch 20 and first safety switch 22 to power opening and closing of the valve. When this second rechargeable battery 29 is present, the taser preferably includes an addition recharge port 30 extending outwardly of the side of the housing 14.

In use, the present invention affords the user of a luxury of a cellular phone with the safety of the incorporated personal defense system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cellular phone and personal defense system for providing a means of communication and a means of self-defense in one unit comprising:

an operational cellular telephone having a housing, the housing including a front face with a keypad, a display, and an ear piece;

the housing further including a periphery defined by a short top face, a short bottom face and a pair of elongated side walls;

the top face of the periphery having an antenna;

a first one of the side walls having a triangular protrusion extending therefrom adjacent to the top face of the periphery;

the cellular telephone having a first rechargeable battery disposed in the housing, one side wall of the housing having a first recharge port extending inwardly thereof;

a personal defense system incorporated into the housing of the cellular telephone;

the personal defense system including a cartridge of pepper spray disposed interiorly of the protrusion of the housing;

the cartridge being in communication with a nozzle extending outwardly of a top extent of the protrusion of the first side wall of the housing;

the nozzle having a valve in communication with an activation switch disposed in the first side wall of the housing adjacent to and beneath the triangular protrusion;

the activation switch being in communication with a first safety switch disposed in the first side wall of the housing beneath the activation switch;

said personal defense system further including a taser disposed interiorly of the protrusion of the housing;

the taser being in communication with a pair of prongs extending outwardly of the top extent of the protrusion of the first side wall of the housing above the nozzle;

the taser being in communication with an activation switch disposed in a second one of the side walls of the periphery of the housing;

wherein the taser is powered by a second battery which is recharged by a second recharge port mounted adjacent to the first recharge port; and the activation switch of the taser being in communication with a second safety switch disposed in a central extent of the top face of the housing.

2. A combination cellular phone and personal defense system for providing a means of communication and a means of self-defense in one unit comprising:

an operational cellular telephone having a housing, the housing including a front face with a keypad, a display, and an ear piece;

the housing further including a periphery defined by a short top face, a short bottom face and a pair of elongated side walls;

the top face of the periphery having an antenna, a first one of the side walls having a triangular protrusion extending therefrom adjacent to the top face of the periphery;

the cellular telephone having a first rechargeable battery disposed in the housing, one side wall of the housing having a first recharge port extending inwardly thereof;

a personal defense system incorporated into the housing of the cellular telephone;

the personal defense system including a cartridge of pepper spray disposed interiorly of the protrusion of the housing;

the cartridge being in communication with a nozzle extending outwardly of a top extent of the protrusion of the first side wall of the housing;

the nozzle having a valve in communication with an activation switch disposed in the first side wall of the housing adjacent to and beneath the triangular protrusion.

3. The combination cellular phone and personal defense system of claim 2, wherein the activation switch is in communication with a safety switch disposed in the first side wall of the housing beneath the activation switch.

4. The combination cellular phone and personal defense system of claim 2, wherein the personal defense system further includes a taser disposed interiorly of the protrusion of the housing, the taser being in communication with a pair of prongs extending outwardly of the top extent of the protrusion of the first side wall of the housing above the nozzle, and wherein the taser is in communication with an activation switch disposed in a second one of the side walls of the periphery of the housing.

5. The combination cellular phone and person defense system of claim 4, wherein the taser is powered by a second battery which is recharged by a second recharge port mounted adjacent to the first recharge port.

6. The combination cellular phone and person defense system of claim 5, wherein the activation switch of the taser is in communication with a second safety switch disposed in a central extent of the top face of the housing.

7. A combination cellular phone and personal defense system for providing a means of communication and a means of self-defense in one unit comprising, in combination:

an operational cellular telephone having a housing, the housing including a front face with a keypad, a display, and an ear piece, the housing further including a periphery defined by a short top face, a short bottom face and a pair of elongated side walls, the top face of the periphery having an antenna, a first one of the side walls having a triangular protrusion extending therefrom adjacent to the top face of the periphery, the cellular telephone having a first rechargeable battery disposed in the housing, one side wall of the housing having a first recharge port extending inwardly thereof; and a personal defense system incorporated into the housing of the cellular telephone, the personal defense system including a taser disposed interiorly of the protrusion of the housing, the taser being in communication with a pair of prongs extending outwardly of the top extent of the protrusion of the first side wall of the housing above the nozzle, the taser being in communication with an activation switch disposed in a second one of the side walls of the periphery of the housing, wherein the taser is powered by a second battery which is recharged by a second recharge port mounted adjacent to the first recharge port.

8. The combination cellular phone and personal defense system of claim 7, wherein the activation switch is in communication with a safety switch disposed in a central extent of the top face of the housing.

* * * * *